(12) United States Patent
Kley

(10) Patent No.: US 7,673,453 B2
(45) Date of Patent: Mar. 9, 2010

(54) HYDRODYNAMIC COUPLING

(75) Inventor: Markus Kley, Ellwangen (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 465 days.

(21) Appl. No.: 10/583,793

(22) PCT Filed: Dec. 9, 2004

(86) PCT No.: PCT/EP2004/014022

§ 371 (c)(1),
(2), (4) Date: Mar. 12, 2007

(87) PCT Pub. No.: WO2005/064184

PCT Pub. Date: Jul. 14, 2005

(65) Prior Publication Data

US 2007/0221463 A1    Sep. 27, 2007

(30) Foreign Application Priority Data

Dec. 22, 2003   (DE) ............................. 103 60 055

(51) Int. Cl.
*F02G 3/00* (2006.01)
*F16D 33/14* (2006.01)
*F16D 33/06* (2006.01)
*F16D 33/18* (2006.01)
*F16D 33/08* (2006.01)
*F16D 33/00* (2006.01)
*F16D 47/00* (2006.01)
*F16D 47/06* (2006.01)

(52) U.S. Cl. ............................. 60/624; 60/614; 60/358; 60/351

(58) Field of Classification Search ............... 60/624, 60/614, 597, 330, 337, 351, 358; *F16D 33/18, F16D 33/08, 33/06, 33/00, 47/06, 47/00*
See application file for complete search history.

(56) References Cited

U.S. PATENT DOCUMENTS 2,375,852 A * 5/1945 Kilchenmann ............... 60/624

(Continued)

FOREIGN PATENT DOCUMENTS

DE            961 058            3/1957

(Continued)

OTHER PUBLICATIONS

A translation of DE 961,058.*

(Continued)

*Primary Examiner*—Thai Ba Trieu
(74) *Attorney, Agent, or Firm*—Ohlandt, Greeley, Ruggiero & Perle, L.L.P.

(57) ABSTRACT

A hydrodynamic coupling that has a primary impeller and a secondary impeller. A drive shaft drives the primary impeller. The drive shaft has a first end, a second end, a central axis, and a prespecified segment between the first and second ends. There is at least one supply channel for introducing a working medium to the toroidal working chamber. The at least one supply channel is formed in the drive shaft at the central axis along the prespecified segment. The plurality of evacuation channels evacuates the working medium from the toroidal working chamber, and the plurality of evacuation channels is formed in the drive shaft radially about the at least one supply channel. The plurality of evacuation channels is formed from the first end up to at least the second end with the first end being located a predetermined distance from the toroidal working chamber.

11 Claims, 3 Drawing Sheets

U.S. PATENT DOCUMENTS

| | | | | |
|---|---|---|---|---|
| 3,058,296 | A | * | 10/1962 | Mischke et al. ............... 60/358 |
| 4,534,456 | A | * | 8/1985 | Slezak ......................... 60/330 |
| 4,773,513 | A | | 9/1988 | Herrmann et al. ........... 188/296 |
| 5,138,840 | A | | 8/1992 | Oguchi et al. ................. 60/624 |
| 5,954,607 | A | * | 9/1999 | Nitsche et al. ................ 475/42 |
| 6,886,337 | B2 | * | 5/2005 | Friedrich et al. .............. 60/614 |
| 7,426,826 | B2 | * | 9/2008 | Adleff ......................... 60/330 |
| 2008/0120973 | A1 | * | 5/2008 | Menne ......................... 60/330 |
| 2008/0216477 | A1 | * | 9/2008 | Kley et al. .................... 60/624 |

FOREIGN PATENT DOCUMENTS

| | | |
|---|---|---|
| DE | 1140595 | 12/1962 |
| DE | 1625770 | 8/1970 |
| DE | 23 21 235 A1 | 11/1973 |
| DE | 3434860 A1 | 4/1986 |
| DE | 92 02 578.1 | 4/1992 |
| DE | 101 20 477 A1 | 11/2002 |
| DE | 101 63 485 C1 | 9/2003 |
| EP | 62274 A2 * | 10/1982 |
| FR | 860103 * | 1/1941 |
| GB | 194739 | 3/1923 |
| GB | 892314 | 7/1957 |
| GB | 1424704 | 2/1976 |
| GB | 2018958 A * | 10/1979 |
| JP | 2000314435 A * | 11/2000 |
| WO | WO 2005064183 A1 * | 7/2005 |

OTHER PUBLICATIONS

International Search Report dated Mar. 7, 2005 for International Application No. PCT/EP2004/014022.

* cited by examiner

HYDRODYNAMIC COUPLING

BACKGROUND OF THE INVENTION

1. Field of the Invention

The invention concerns a hydrodynamic coupling and particularly the line that conducts the working medium inside the hydrodynamic coupling.

2. Description of Related Art

Hydrodynamic couplings are known. A particular field of application is in the area of turbocompound systems, in which an exhaust gas turbine is disposed in a drive train in the exhaust gas flow of an internal combustion engine and is in a driven connection with the crankshaft. In such systems, in the driven connection between the exhaust gas turbine and the crankshaft, a hydrodynamic coupling is advantageously connected in order to transfer power or torque, respectively. If the primary impeller of such a hydrodynamic coupling is driven by the exhaust gas turbine, this turbine, via the flow circuit for working medium in the working chamber of the hydrodynamic coupling, drives the secondary impeller of the hydrodynamic coupling, which is usually connected to the crankshaft by means of a suitable gear. This first driving mode is also referred to as the turbocoupling mode.

As long as the hydrodynamic coupling is equipped with a means for locking the primary impeller resistant to rotation, the hydrodynamic coupling may also be used in a second mode—a retarder mode—for braking the crankshaft. In this mode, the secondary impeller is driven by the crankshaft, the primary impeller is locked resistant to rotation, for example, by means of a multiplate coupling, and the crankshaft is braked by the transfer of torque from the secondary impeller to the primary impeller. Based on the fact that in one case (turbocoupling mode), the primary impeller is driven, and in the other case (retarder mode), the secondary impeller is driven, the direction of the flow of circulating working medium is opposite for the two cases. Therefore, the direction of axial thrust varies, a fact which must be taken into consideration in the design of the bearing and the shaft seals.

In addition, the rpm ranges are different in the turbocoupling mode and in the retarder mode. Overall, there usually results an rpm range between 4000 rpm and 12,000 rpm. The inlet and outlet seals, i.e., the seals with which the channels introducing the working medium and the channels discharging the working medium are sealed, are operated in this rpm range. In all relative seals, i.e, in seals between the components, when one of these rotates at a different rpm than the other and when one rotates and the other does not rotate, there is the problem, in particular, that two distinct operating ranges are present. Therefore, relative seals are conventionally designed in the form of an expensive floating ring seal. Such a floating ring seal is comparatively expensive and sensitive to disruption.

BRIEF SUMMARY OF THE INVENTION

The object of the invention is to provide a hydrodynamic coupling, particularly for application in a turbocompound system, which is improved when compared with the prior art. In particular, the hydrodynamic coupling according to the invention will make do with fewer floating ring seals.

The object according to the invention is solved by a hydrodynamic coupling having a primary impeller, a secondary impeller. The primary and secondary impellers form a toroidal working chamber. A drive shaft drives the primary impeller. The drive shaft has a first end, a second end, a central axis, and a prespecified segment between the first and second ends. There is at least one supply channel for introducing a working medium to the toroidal working chamber. The at least one supply channel is formed in the drive shaft at the central axis along the prespecified segment. The plurality of evacuation channels evacuates the working medium from the toroidal working chamber, and the plurality of evacuation channels are formed in the drive shaft radially about the at least one supply channel. The plurality of evacuation channels are formed from the first end up to at least the second end, the first end being located a predetermined distance from the toroidal working chamber.

The hydrodynamic coupling according to the invention is characterized by the fact that in a drive shaft, which drives the primary impeller, a supply channel is formed for introducing the working medium into the working chamber and an evacuation channel is formed for the simultaneous evacuation of working medium from the working chamber. Of course, several supply channels and several evacuation channels may also be provided. In particular, a central supply channel and several evacuation channels surrounding this central supply channel are considered.

By providing supply channels and evacuation channels, respectively, within the drive shaft, all channels rotate at the same rpm, so that when compared with conventional designs, in which the supplying channels were formed by a component with a first rpm and the evacuating channels were formed by a component with a second rpm, and thus had to be sealed individually relative to the stationary components, at least one expensive floating ring seal can be dispensed with. Instead of this, a simpler gap seal is made possible between the inlet and outlet.

The one or more supply channels and the one or more evacuation channels advantageously run in the axial direction in the drive shaft, at least over a pregiven segment. The one or more evacuation channels are advantageously disposed radially outside the one or more supply channels. On the one hand, the seal between the channels can be designed particularly simple in this way, and, on the other hand, the evacuation channels disposed radially on the outside can open up in a region of greater circumference of the working chamber of the hydrodynamic coupling, and the supply channels that are radially on the inside can open up in a region of the working chamber which is located in a segment lying radially further on the inside. In particular, a region between the radial inner circumference and the circumference of intermediate height of the working chamber is taken into consideration for these radially inner openings. In particular. the working medium is guided directly into the center, i.e., the region of the central point of the circuit flow, into the so-called eye of the retarder.

This positioning of the openings at prespecified heights of the working chamber is then particularly favorable when the hydrodynamic coupling is operated both in the turbocoupling mode as well as in the retarder mode. In the retarder operation, that is, due to the high evolution of heat in the working chamber, a large throughput of working medium is necessary in order to evacuate the heat that evolves along with the working medium. Due to the evacuation channels provided on the outer circumference, i.e., in the region of the greatest diameter of the working chamber that is shaped like an annular space, the openings of which oppose the flow direction of the working medium circuit on the outer circumference of the working chamber in retarder operation, a considerable part of the working medium flows out directly from the working chamber due to its alignment opposite to the meridian flow direction that is present here. In the turbocoupling operation, in contrast, in which the working medium is heated to a lesser extent by far, due to the smaller slip (the latter amounts to 100 percent in the retarder operation, and advantageously 3 to 5 percent in the turbocoupling operation), a smaller throughput of working medium through the hydrodynamic coupling is necessary. Since in this case, the meridian flow is the reverse, the largest part of the working medium flows through the radially outer-lying openings of the evacuation channels that are now aligned in the direction of the flow of working medium, and a correspondingly smaller throughput results. The opening of the evacuation channels on the circumference, in particular, the outer circumference of the working chamber is thus advantageously designed tangential, in particular, in the primary impeller; i.e, the first section viewed in the flow direction, which connects to the opening of the evacuation channels in the working chamber, is formed in the primary impeller tangential to the circumference, in particular, in the region of the greatest diameter, of the working chamber. Advantageously, this region runs in an axis-parallel manner to the axis of rotation of the hydrodynamic coupling. This is described later in further detail with reference to FIG. 1.

The invention will be explained in more detail below on the basis of an embodiment example.

BRIEF DESCRIPTION OF THE DRAWINGS

Herein is shown.

DETAILED DESCRIPTION OF THE PREFERRED EMBODIMENTS

Figure 1:
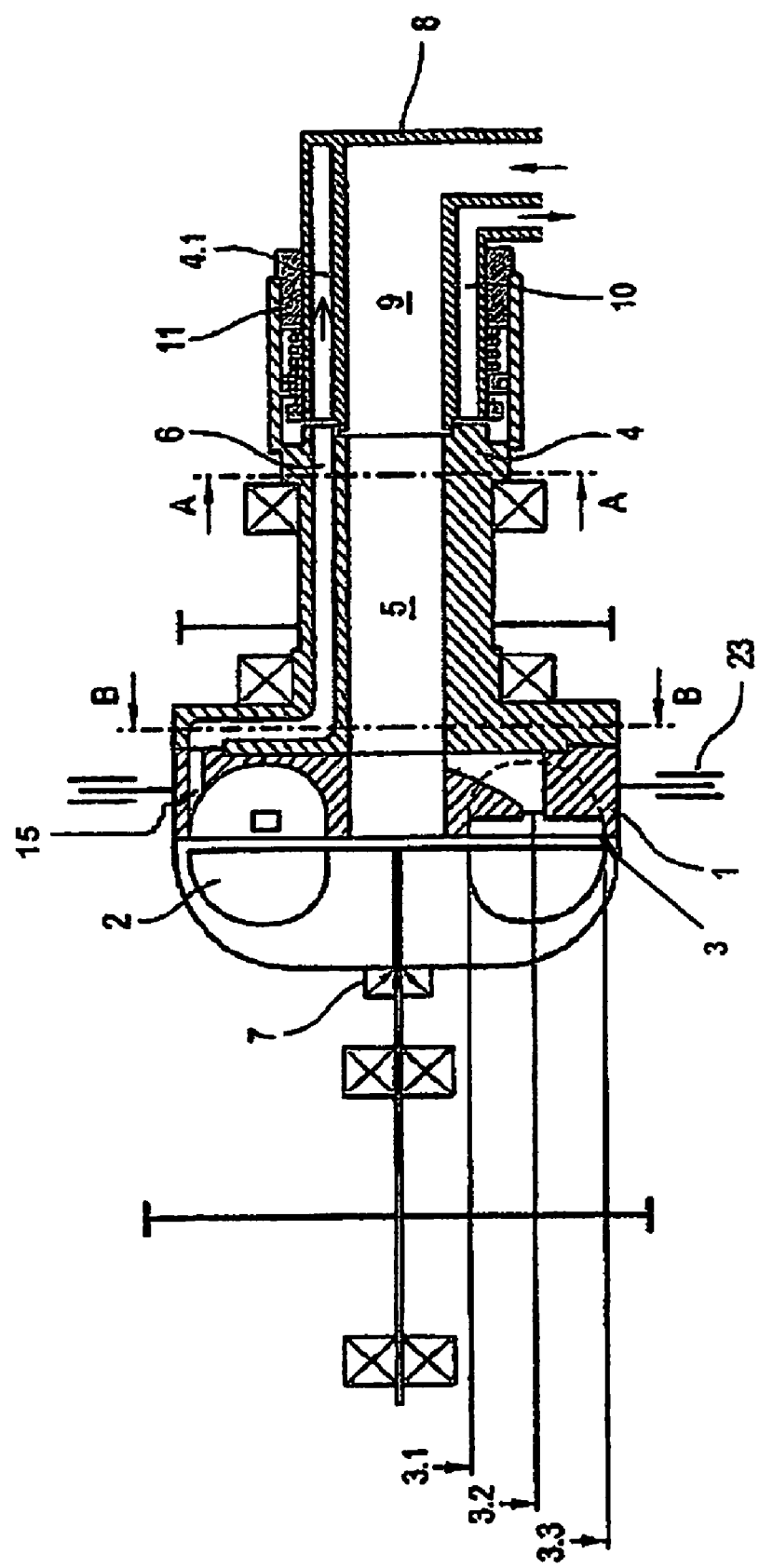
FIG. 1 an example of embodiment of a hydrodynamic coupling according to the invention in a longitudinal sectional view.

In the axial segment shown in FIG. 1, a primary impeller 1 can be recognized, which is disposed on a drive shaft 4. Taken individually, primary impeller 1 is screwed onto the drive shaft 4 on the front side and sealed in such a way that the front-side contour of drive shaft 4 forms a part of the end segment of a supply channel 5, which opens up in the center of a working chamber 3 in a region of the circumference 3.2. In addition, the supply channel 5 runs through the lengthwise axis of the drive shaft 4 in the longitudinal direction and is thus formed as a through-hole. This has the advantage that, through the axial segment of supply channel 5, the screws which are shown, by means of which the secondary impeller is screwed onto a shaft 7 on the front side, can be tightened or loosened, respectively.

Figure 2:
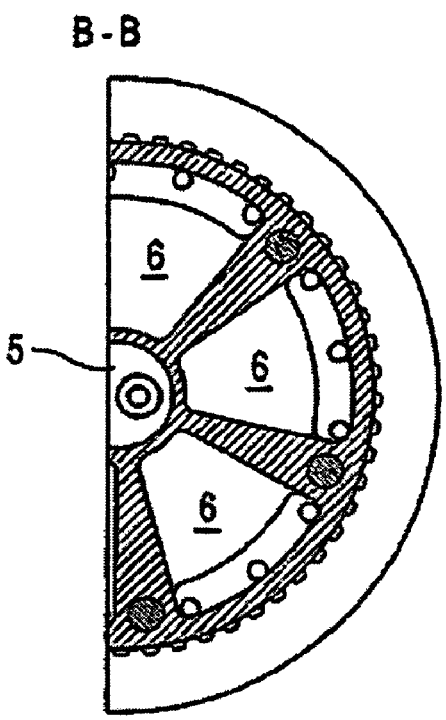
FIG. 2 a cross-sectional view along the line of intersection B-B of FIG. 1.
Figure 3:
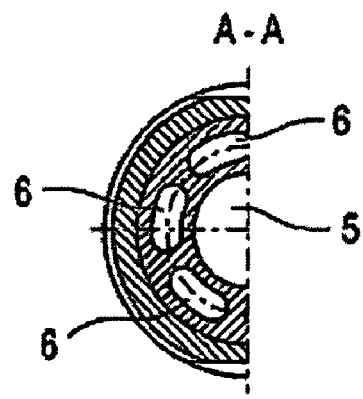
FIG. 3 a cross-sectional view along the line of intersection A-A of FIG. 1.

A plurality of evacuation channels 6 for evacuating working medium from the working chamber 3 of the hydrodynamic coupling is formed radially outside the supply channel 5 in the drive shaft 4. Such an evacuation channel 6 can be recognized above the lengthwise axis in the cross section. The plurality of evacuation channels 6 completely encloses the supply channel 5, as can be seen particularly in FIGS. 2 and 3.

The evacuation channels 6 essentially have a flow cross section in the form of a sector of an annular gap. In contrast, the supply channel has a circular flow cross section over the largest axial region and is first guided radially outward in the region of the primary impeller, and opens up into the center of working chamber 3, in the form of a plurality of inlet bores, which are distributed over the circumference 3.2.

The evacuation channels 6 also run at first in the axial direction, beginning from the end 4.1 of the drive shaft 4 on the drive side and are then deflected radially outward in the region of the primary impeller 1 in such a way that they again open up axially into working chamber 3 in the region of the largest diameter 3.3. This offers the advantage, which has already been described above, that the flow of working medium, during retarder operation, is pressed directly into the openings of evacuation channels 6, which has as a consequence a correspondingly large throughput through the hydrodynamic coupling, since, during retarder operation, the flow in the secondary impeller 2 is accelerated toward the outside and enters axially into primary impeller 1 in the region of the outer circumference 3.3 (in the direction from left to right in FIG. 1). In the turbocoupling operation, in contrast, the working medium flows in the circulating flow from right to left in the region of the outer circumference 3.3, i.e., axially from the primary impeller into the secondary impeller, and a correspondingly smaller part of working medium is taken up by the evacuation channels 6. Most of the working medium flows out over the outlet openings 15 of the evacuation channels 6, is slowed down radially toward the inside in the secondary impeller, and again axially enters into the primary impeller 1 in the region of the inner circumference 3.1 of working chamber 3.

The working medium is conducted into the supply channel 5 and from the evacuation channels 6 via the end side 4.1 of the drive shaft 4. For this purpose, on the front side of the drive shaft 4, a module 8 with a central channel 9 is disposed, as well as a channel 10 which is shaped like an annular gap and surrounds the central channel 9. The central channel 9 for working medium has a circular flow cross section, at least in the region of the end turned toward the drive shaft 4, wherein the supply channel 5 and the channel 9 for working medium are aligned with one another. Due to the cross section of the channel 10 for working medium, which is shaped like an annular gap at least in the end region of module 8, which is turned toward the drive shaft 4, the evacuation channels 6 are also aligned with the channel 10 for working medium.

A sealing of the evacuation channel 6 or the channel 10 for working medium, respectively, relative to the environment, is provided by means of a floating ring seal 11.

A special sealing of the supply channel 5 or of the channel 9 for working medium, respectively, is not necessary; here, only a gap-shaped sealing is provided in the region of the connection of the drive shaft 4 relative to module 8. A small amount of leakage from supply channel 5 or from channel 9 for working medium, respectively, into evacuation channels 6 or the channel 10 for working medium, respectively, is permissible.

Since in conventional embodiments, in which the working medium is introduced into the working chamber via the drive shaft 4 and the working medium is evacuated from the working chamber via shaft 7, in the region of the far removed axially located end of the shaft 7, a floating ring seal also had to be provided, corresponding to the floating ring seal 11, the embodiment shown offers the advantage that a floating ring seal is less necessary. This leads to reduced costs and to a higher operating reliability.

Both impellers, i.e., primary impeller 1 and secondary impeller 2, are mounted in floating manner on the respective shafts 4 and 7. All bearings outside the core region of the hydrodynamic coupling can be positioned in this way.

Figure 4:
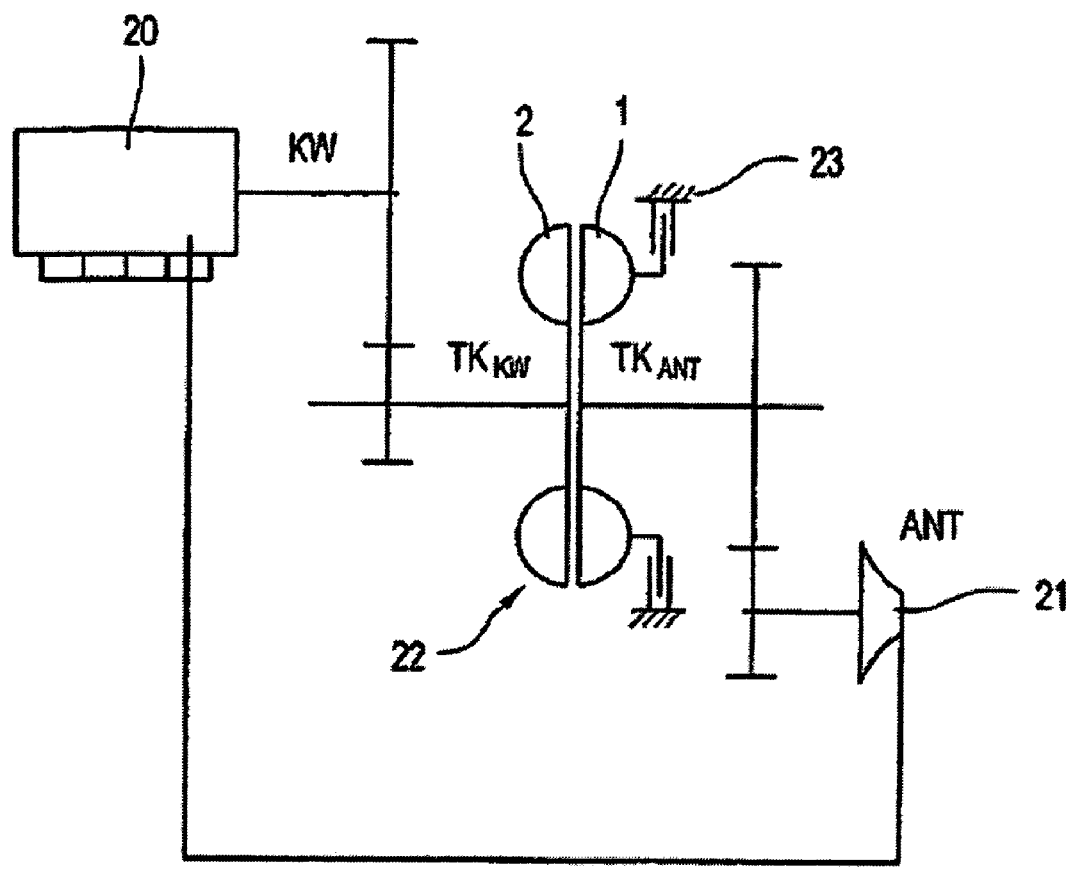
FIG. 4 the arrangement of a hydrodynamic coupling according to the invention in a drive train of a turbocompound system.

A hydrodynamic coupling which is connected in a driven connection between the crankshaft KW and an exhaust gas turbine 21 (ANT) can be recognized in FIG. 4. A crankshaft KW, as is known, is driven by an internal combustion engine 20, and an exhaust gas turbine 21 is disposed in the flow of exhaust of the internal combustion engine 20, in order to utilize the exhaust gas energy for driving the crankshaft (turbocoupling operation of a hydrodynamic coupling 22).

In the retarder operation of the hydrodynamic coupling 22, the primary impeller 1 is locked against rotation by means of a multiplate coupling 23, and torque transmitted to the secondary impeller 2 by the crankshaft is drawn off via the primary impeller 1 and the multiplate coupling 23, so that the crankshaft is braked.

LIST OF REFERENCE NUMBERS

1 Primary impeller
2 Secondary impeller
3 Working chamber
4 Drive shaft
4.1 Front side of the drive shaft
5 Supply channel
6 Evacuation channel
7 Shaft
8 Module
9 Channel for working medium
10 Channel for working medium
11 Floating ring seal
20 Combustion engine
21 Exhaust gas turbine
22 Hydrodynamic coupling
23 Multiplate coupling

The invention claimed is:

1. A hydrodynamic coupling comprising:
a primary impeller;
a secondary impeller, said primary and secondary impellers forming a toroidal working chamber;
a drive shaft driving said primary impeller, said drive shaft having a first end, a second end, a central axis, and a segment between said first and second ends;
at least one supply channel for introducing a working medium to said toroidal working chamber, said at least one supply channel being formed in said drive shaft at said central axis along said segment; and
a plurality of evacuation channels for evacuating said working medium from said toroidal working chamber, said plurality of evacuation channels being formed in said drive shaft radially about said at least one supply channel, said plurality of evacuation channels being formed from said first end up to at least said second end, said first end being located a distance from said toroidal working chamber.

2. The hydrodynamic coupling of claim 1, wherein said primary impeller is on said drive shaft or is formed as a part of said drive shaft.

3. The hydrodynamic coupling of claim 1, wherein said plurality of evacuation channels open into said toroidal working chamber in a region of an outer circumference of said toroidal working chamber, wherein said at least one supply channel opens into said toroidal working chamber in a region of an intermediate circumference of said toroidal working chamber, said region of an intermediate circumference being between a region of an inner circumference and said region of an outer circumference of said toroidal working chamber.

4. The hydrodynamic coupling of claim 3, wherein each of said plurality of evacuation channels and said at least one supply channel comprise an inlet opening.

5. The hydrodynamic coupling of claim 1, wherein said primary and secondary impellers are mounted on said drive shaft in a floating manner.

6. The hydrodynamic coupling of claim 1, wherein said primary impeller is changeable from a non-locked position to a locked position, wherein in the locked position said primary impeller is locked against rotation so that the hydrodynamic coupling exercises the function of a retarder when said secondary impeller is driven.

7. A drive train comprising:
an internal combustion engine driving a crankshaft;
an exhaust gas turbine disposed in a flow of exhaust from said internal combustion engine, said exhaust gas turbine being connected with said crankshaft; and
a hydrodynamic coupling disposed between said exhaust gas turbine and said crankshaft, said hydrodynamic coupling comprising:
a primary impeller and a secondary impeller forming a toroidal working chamber;
a drive shaft driving said primary impeller, said drive shaft having a first end, a second end, a central axis, and a segment between said first and second ends;
at least one supply channel for introducing a working medium to said toroidal working chamber, said at least one supply channel being formed in said drive shaft at said central axis along said segment; and
a plurality of evacuation channels for evacuating said working medium from said toroidal working chamber, said plurality of evacuation channels being formed in said drive shaft radially about said at least one supply channel, said plurality of evacuation channels being formed from said first end up to at least said second end, said first end being located a predetermined distance from said toroidal working chamber.

8. The drive train according to claim 7, wherein said primary impeller is changeable from a non-locked position to a locked position, wherein in the locked position said primary impeller is locked against rotation so that said hydrodynamic coupling brakes said crankshaft hydrodynamically.

9. A hydrodynamic coupling comprising:
a primary impeller;
a secondary impeller, said primary and secondary impellers forming a toroidal working chamber;
a drive shaft driving said primary impeller, said drive shaft having a first end, a second end, a central axis, and a segment between said first and second ends;
at least one supply channel for introducing a working medium to said toroidal working chamber, said at least one supply channel being formed in said drive shaft at said central axis along said segment; and
a plurality of evacuation channels for evacuating said working medium from said toroidal working chamber, said plurality of evacuation channels being formed in said drive shaft radially about said at least one supply channel, said plurality of evacuation channels being formed from said first end up to at least said second end, said first end being located a distance from said toroidal working chamber,
wherein at least one of said plurality of evacuation channels opens tangentially opposite a flow direction of said working medium, wherein said primary impeller is mechanically locked against rotation, and wherein said at least one of said plurality of evacuation channels has a section formed in said primary impeller in an axis-parallel manner relative to an axis of rotation of the hydrodynamic coupling.

10. A hydrodynamic coupling comprising:
a primary impeller;
a secondary impeller, said primary and secondary impellers forming a toroidal working chamber;

a drive shaft driving said primary impeller, said drive shaft having a first end, a second end, a central axis, and a segment between said first and second ends;

at least one supply channel for introducing a working medium to said toroidal working chamber, said at least one supply channel being formed in said drive shaft at said central axis along said segment; and a plurality of evacuation channels for evacuating said working medium from said toroidal working chamber, said plurality of evacuation channels being formed in said drive shaft radially about said at least one supply channel, said plurality of evacuation channels being formed from said first end up to at least said second end, said first end being located a distance from said toroidal working chamber, further comprising:

a module located at an end of said driveshaft, said module comprising an inner channel and an outer channel, said inner channel for said working medium, said inner channel being connected to said at least one supply channel in a flow-conducting manner, said outer channel for said working medium, said outer channel surrounds said inner channel, said outer channel being shaped as an annular gap in cross section, said outer channel being connected in a flow-conducting manner with at least one of said plurality of evacuation channels.

11. The hydrodynamic coupling of claim 10, wherein said inner channel is shaped as an annular gap in cross section.

* * * * *